Dec. 15, 1959 A. S. GORSHKOFF ET AL 2,916,930
REVERSE GEAR
Filed Feb. 29, 1956 4 Sheets-Sheet 1

INVENTORS
A. S. Gorshkoff
H. A. Reie
BY Rockwell & Bartholow
ATTORNEYS

Dec. 15, 1959 A. S. GORSHKOFF ET AL 2,916,930
REVERSE GEAR
Filed Feb. 29, 1956 4 Sheets-Sheet 2

INVENTORS
A. S. Gorshkoff
H. A. Reil
BY Rockwell & Bartholow
ATTORNEYS

Dec. 15, 1959   A. S. GORSHKOFF ET AL   2,916,930
REVERSE GEAR
Filed Feb. 29, 1956   4 Sheets-Sheet 3

INVENTORS
A. S. Gorshkoff
H. A. Reil
BY
Rockwell Bartholow
ATTORNEYS

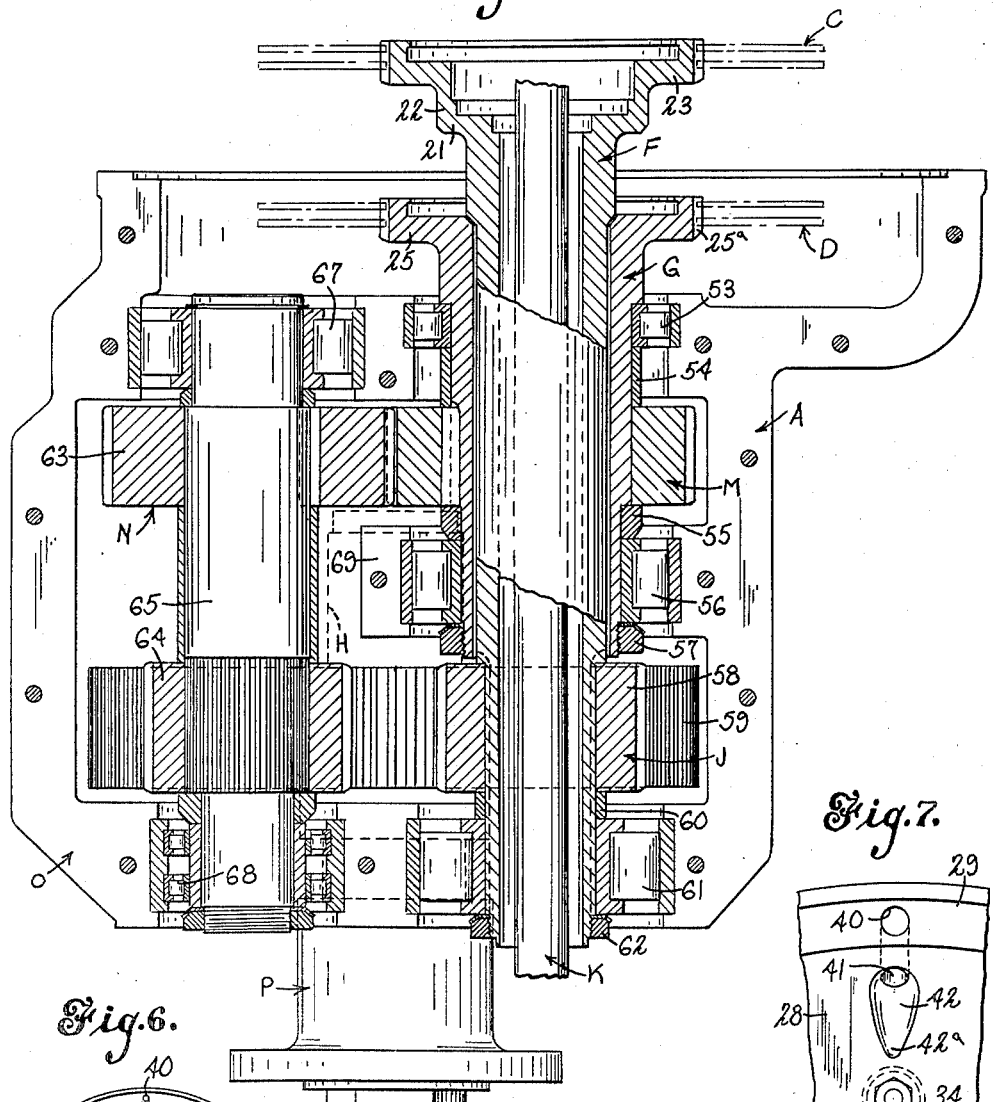

2,916,930

REVERSE GEAR

Alexis S. Gorshkoff, Southbury, and Henry A. Reil, Hamden, Conn., assignors to The Snow-Nabstedt Gear Corporation, Hamden, Conn., a corporation of Connecticut Application February 29, 1956, Serial No. 568,511

2 Claims. (Cl. 74—377)

This invention relates to reverse gears, and more particularly to those for use in boats and other marine equipment where a prime mover drives a propeller shaft, although the invention has utility in other fields.

One of the objects is to provide a reverse gear having an improved arrangement of driving member, hydraulically operable friction clutches for forward and reverse, respectively, and gear members for effecting reverse motion of the output shaft.

Another object is to provide a reverse gear having improved means for supplying and distributing the fluid used for actuation of the hydraulic clutches.

A further purpose of the invention is to provide improvements in the friction clutch mechanism, as well as in other parts of the reverse gear.

To these and other ends the invention consists in the novel features and combinations of parts to be hereinafter described and claimed.

In the accompanying drawings;

Fig. 3 is an enlarged section on line 3—3 of Fig. 1, showing the gear in the neutral position;

Figure 2:
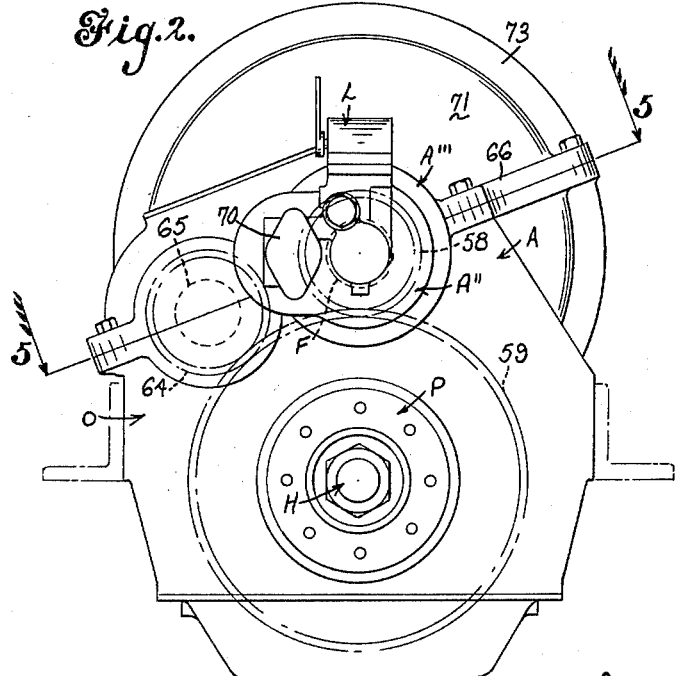
Fig. 2 is an end view showing the rear end of the gear.
Figure 4:
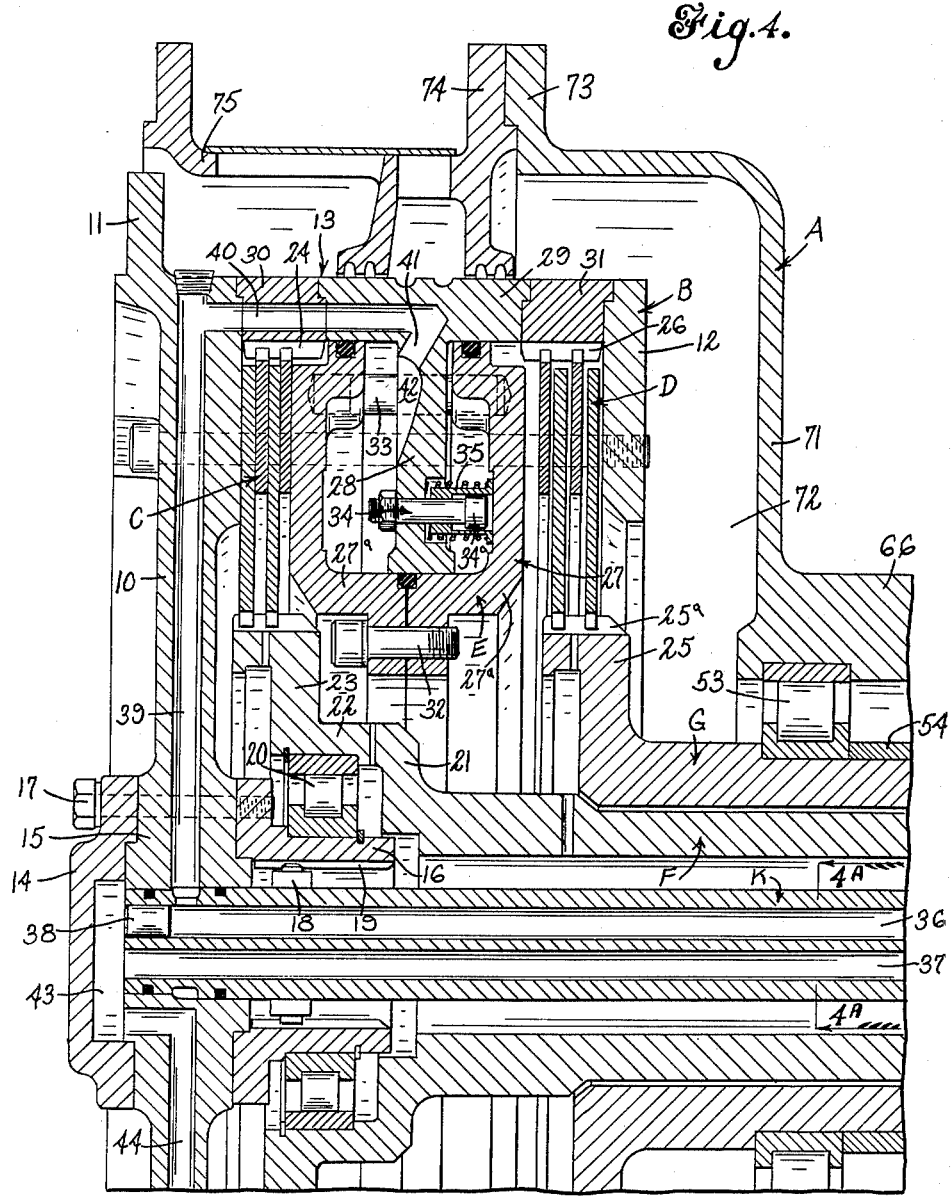
Figure 4A:
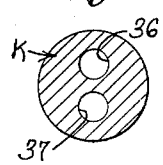

Fig. 3ᴬ is a fragmentary section on a larger scale of certain parts shown in Fig. 3;

Fig. 4 is an enlarged vertical longitudinal section showing a portion of the clutch mechanism, which mechanism is in position for effecting forward drive;

Fig. 4ᴬ is a section on line 4ᴬ—4ᴬ of Fig. 4;

Fig. 5 is an enlarged section on line 5—5 of Fig. 2;

Fig. 6 is a detail of the partition wall member forming a part of the driving shell; and Fig. 7 is a fragmentary view of the partition wall on a larger scale.

The reverse gear selected for illustration has a housing in which is housed at the forward end a driving shell or drum, said shell or drum being within and close to an open forward end of the housing and having a peripheral flange that can be connected directly to the peripheral part of a prime mover flywheel located in close adjacency to the housing. The driving shell or drum is concentrically arranged with respect to a hollow driven shaft having its forward end located within the shell, the rear end portion of said shaft being connected by reduction gearing to an offset parallel lower shaft in the housing, the rear end of which offset shaft is adapted to be coupled to a propeller shaft or the like. Somewhat rearwardly of the forward end of said driven shaft is located the forward end of a driven sleeve or quill which surrounds a portion of said driven shaft and which can be used for driving said offset shaft in the reverse direction. For forward drive a pinion on the driven shaft rearwardly of said sleeve or quill rotates an engaging gear on the offset output shaft. In the position for reverse drive, a pinion on said sleeve or quill drives a group of gears one of which engages and drives the gear, called a bull gear, carried by the output shaft. The driving shell houses within it two hydraulically operated friction clutches, one having a forward location and being adapted to drive the driven shaft from the forward end of the latter, and the other having a rear location and being adapted to drive the sleeve or quill from the forward end. The pressure fluid for actuating the friction clutches is delivered to the mechanism adjacent the rear end of the housing, and is received in parallel passages formed as longitudinal bores in a distributing shaft or rod that extends substantially throughout the length of the housing and is driven by the driving shell or drum, said distributing shaft being located within the hollow driven shaft above mentioned. Each of the longitudinal bores in the distributing shaft is connected to a chamber or fluid space appurtenant to one of the friction clutches, and a control valve adjacent the rear end of the housing can be actuated to supply pressure fluid to one clutch or the other, as desired.

In the drawings, the housing is indicated at A, the driving drum or shell at B, the forward movable clutch member at C, the rearward movable clutch member at D, the hydraulic mechanism for actuating the movable clutch members at E, the hollow driven shaft at F, the sleeve member or quill at G, the offset output shaft at H, and the reduction gearing between shafts F and H at J. The distributing shaft for the hydraulic mechanism, located within the shaft F, is indicated at K, and at L is indicated a selector valve on the rear end portion of the housing, said valve in this instance having the neutral position shown in Fig. 3 and having its lever movable forwardly for effecting forward drive and rearwardly for effecting reverse drive.

Intermediate its ends, the sleeve G has keyed thereto a pinion M and this pinion cooperates with gearing N (Fig. 5) in effecting reverse drive when the sleeve G is driven from the driving shell. The offset shaft H extends outwardly at its rear end through the rear wall portion O of the housing and in this location may be provided with a coupling member P suitable for driving a propeller shaft or the like.

The shell or drum B has a forward wall 10 equipped with a peripheral flange 11 adapted for attachment to an engine flywheel (not shown) or like prime mover so as to produce rotation of the shell. The shell has a rear wall 12 and an axially extending peripheral wall 13. The movable clutch element C is adapted to be engaged with the front wall for driving the shaft F, and the element D is engaged with the rear wall for causing rotation of sleeve member G. The distributing shaft K extends into a bore in the forward wall of the shell, as best shown in Fig. 4, the forward end face of the shaft being substantially flush with the outer face of the wall. A cap member 14 is fitted over the forward end of the distributing shaft and over a thickened hub portion 15 of the wall 10, and adjacent the rear face of this hub portion is placed a flanged ring 16. Bolts 17 are placed through the cap plate 14, the ring 16 and the hub portion 15 for fastening these parts together. The distributing shaft K adjacent its forward end has applied thereto as by welding, button-like members 18, diametrically located, which button members engage grooves 19 extending lengthwise of the sleeve portion of the rings 16, whereby the distributing shaft is prevented from turning with respect to the driving shell.

Supported upon the sleeve of the ring 16 at the exterior of the sleeve is an anti-friction bearing 20 and this bearing revolubly supports on the forward wall structure of the shell or drum the forward end of the driven shaft F. The forward end of this shaft has a widened bell-shaped mouth structure, best shown in Fig. 4. The mouth portion includes a laterally directed flange portion 21, a forwardly and axially directed portion 22 and at the forward extremity, a laterally directed flange 23. At the radially outer face of the flange 23, this flange is provided with splines which engage certain friction plates of the previously mentioned clutch element C. In the case illustrated, the clutch element C comprises four axially movable plates two of which are splined to the flange 23 at the forward end of the driven shaft and the other two of which are splined to the peripheral wall of the driving shaft by splines 24 (Fig. 4).

The driving flange for the driven shaft is located in line with the plates of element C and in a similar manner the sleeve G is connected with the plates of the clutch element D. Sleeve G has a bell-shaped mouth with a flange 25 which is splined at 25ª to engage certain plates, as above described, and other plates are engaged with a splined portion 26 on the peripheral wall of the shell.

The friction plates of elements C and D are shiftable by a duplex piston element 27 straddling a partition wall 28 extending inwardly from the peripheral wall of the driving shell. The arrangement is such that fluid spaces are created at the respective sides of partition 28 within the piston so that fluid delivered to one of these spaces will move the piston in one direction and fluid introduced into the other will move the piston in the opposite direction. In the form shown, the partition 28 is integral with a wall section 29 of the driving shell, and the splined portions 24 and 26 of the shell are formed on sections 30 and 31. Sections 30 and 31 are abutted against opposite sides of the section 29 and the three sections are interposed between the walls 10 and 12 of the shell and fastened to these walls by suitable bolts, one of which is shown in Fig. 4.

The duplex annular piston 27 is substantially U-shaped in cross section and comprises two identical halves or portions 27ª fastened together by bolts 32 to provide the closed part of the U. The mouth portion of the U slides along the peripheral wall 13 of the shell and is somewhat narrowed by giving it a conformation such as shown in Fig. 4. The piston is prevented from turning relatively to the partition 28 by suitable means such as one or more guide pins 33 projecting through the partition and engaging guide sockets in the adjacent portions of the piston.

The piston is spring-biased so that normally it is held in a symmetrical position with respect to the partition with substantially equal fluid spaces at opposite sides. In the form shown, this is accomplished by providing the partition with two spring-pressed plungers which respectively engage opposite piston walls. These spring-pressed plungers are located at diametrically opposite points on the partition, as shown in Fig. 6, and each of these plungers, which are indicated at 34, are preferably of the structure shown in Fig. 4. The structure of the plunger includes a bolt-like member fastened in place in the partition and having at one side a cylindrical head 34ª on which is slidable a spring-pressed sleeve 35 engaged with the inner surface of the piston.

The bored-out distributing shaft or rod K is provided substantially throughout its length with bores 36 and 37 that are diametrically arranged, bore 36 being adapted to supply fluid to clutch C. As shown in Fig. 4, the forward end of bore 36 is closed by means such as a plug 38 and the closed end of the bore has lateral communication with a radial passage 39 in the forward wall of the shell. This passage 39 communicates with a rearwardly leading passage 40 in the wall 13, and passage 40 leads to an inlet to the forward fluid space of the duplex piston. The passage 40 leads to a point slightly beyond the center plane of the partition 28 and from this point or region, an inlet 41 is sloped inwardly and forwardly at an acute angle and delivers to a delivery mouth 42 formed in the side face of the partition. This arrangement provides for conducting hydraulic fluid radially inwardly and slightly forwardly so that it will press against the adjacent wall of the duplex piston and cause engagement of the forward clutch.

The connections for supplying the rearward clutch D with motive fluid are similar to those just described. The forward end of the bore 37 in the shaft K is, however, left open in this case so that liquid moves into a space 43 formed in the cap 14 and thence passes into a passage 44 in the forward shell wall which is at the other side of the shell axis and opposite the passage 39. The provisions for carrying fluid from the passage 44 to the rear fluid space of the hydraulic device are of the structure described above although the terminal part of the passage in the peripheral wall of the shell is, in this case, sloped inwardly and rearwardly, as appears from Fig. 3. As in the previous case, the passage bore communicates with a shallow scooped out mouth in the face of the partition (indicated at 42) and this mouth, where it joins the bore, is somewhat wider than the bore and tapers toward a narrow end 42ª, as shown in Fig. 7.

As best shown in Fig. 3 and Fig. 3A, the rearward ends of the passages 36 and 37 stop short of the rear end of the distributing shaft, and said shaft in this region is located in a relatively small housing section A″ upon which is supported the selector valve L. Toward its rear end the distributing shaft has keyed thereto a gear 43ª, and an antifriction bearing 44ª in housing section A″ rotatably supports the gear and thereby the rear end portion of the shaft. Between the housing section A″ and the rear end of the main housing a short housing section A‴ is interposed and this section A‴ is provided with an inlet passage 45 that can be connected to a source (not shown) of liquid lubricant. Lubricant forced into the passage 45 will enter a chamber in the housing section A‴ which is immediately adjacent and in communication with the open rear extremity of the driven shaft F, and this lubricant may then be forced forwardly in the annular passage between this shaft and the distributing shaft for the purpose of lubricating the forward bearing of the driven shaft, the movable parts of the clutches in the driving shell, and the bearings which support the quill or sleeve and the rear end portion of the driven shaft, as pointed out more particularly hereinafter. Some of the lubricant entering the passage 45 may pass forwardly around the exterior of the driven shaft for lubrication of the external parts.

The valve L has a casing supported on top of the housing section A″ and in communication with upright passages 46 and 47. These passages lead to ports in a bushing 48 in which the rear end portion of shaft K rotates, and the passage 46 can be placed in communication with a groove 49 in the bushing that communicates with a port 50 in the shaft leading to passage 36, whereas passage 47 leads to a groove 51 that is in communication with a port 52 leading to passage 37. The lever of valve L is in the neutral position in Fig. 3, and in this position the supply of hydraulic fluid to passages 46 and 47 is cut off. When the lever is swung toward the left (Fig. 3), fluid is supplied to passage 46 so as to move the piston 27 forwardly by fluid entering the forward fluid chamber from the passages 39 and 40, thus engaging the clutch element C and causing rotation of the driven shaft for forward drive. When the lever of valve L is swung to the right (Fig. 3), fluid is delivered to passage 37 of the distributing shaft for the purpose of engaging clutch element D with the rear wall of the driving shell and rotating sleeve G to produce reverse drive through gearing presently to be described. The valve L is of such structure and arrangement that when one clutch chamber is under pressure the other is opened for exhaust.

It has been stated that the sleeve G has keyed thereto intermediate its ends the pinion M used in reverse drive. Forwardly of this pinion and slightly rearwardly of the bell-shaped mouth of the sleeve G, an anti-friction bearing 53 surrounds the sleeve in a seat between the sleeve and the housing so that in this region the sleeve is supported from the housing. Between bearing 53 and pinion M is part of a spacer ring 54, and a spacing collar 55 surrounds the sleeve at the opposite side of the pinion. Immediately to the right of the spacing collar 55 (Fig. 3) is another anti-friction bearing 56 supporting the sleeve from the housing in this location. This assembly of parts is completed by a nut 57 engaging threads on the rear end of the sleeve G and serving to hold the inner race of bearing 56 in place on the sleeve and to secure the parts 54, M and 55.

To the right of nut 57 (Fig. 3) the reduction gearing J comprises a pinion 58 keyed to the shaft F and meshing with an externally toothed bull gear 59 that is keyed to the offset shaft H. To the right of pinion 58 a spacer 60 abuts the pinion and also abuts an anti-friction bearing 61 which supports the rear end portion of shaft F in the main portion of the housing. This assembly of pinion 58, spacer 60 and bearing 61 relatively to the shaft F, is completed by a nut 62 screwing on the rear end of the shaft. It will be seen that in the arrangement of parts which has just been described, the sleeve G is supported in the housing by bearings one of which is near the forward end of the sleeve and the other close to the rear end, the sleeve carrying a pinion in a location between these bearings, and it is apparent that the pinion 58 on the driven shaft is located between a bearing for the end of the shaft and a bearing supporting the rear end of the sleeve or quill G.

The pinion M is connected with the output shaft H by the previously mentioned gearing N and the latter gearing comprises a pinion 63 meshing with pinion M and a second pinion 64 meshing with the bull gear 59. These pinions 63 and 64 are both keyed to a short idler shaft 65 that is parallel to the driven shaft and to the output shaft. This pinion shaft 65 is mounted in the main part of housing A and this main part has a removable upper section 66 (Fig. 2) between which and the main body of the housing the driven shaft F and the pinion shaft 65 are interposed. The parting line between these members is at an acute angle to the horizontal, as shown in Fig. 2, and the cover section 66 is fastened in place by suitable means such as the bolts shown in Figs. 1 and 2. The output shaft H, carrying the bull gear, is in vertical alignment with the driven shaft, and the pinion shaft 65 is off to one side and at a lower elevation than the driven shaft. When the sleeve G is driven by engaging clutch element D with the driving shell, reverse drive is imparted to the driven shaft by rotation of externally toothed gearing comprising spur pinion M meshing with pinion 63 and pinion 64 meshing with the bull gear 59.

The pinion shaft 65 is supported rotatably in the main housing section in proximity to the driven shaft, said pinion shaft having at opposite ends anti-friction bearings in the housing. The forward bearing is indicated at 67 and the rear bearing at 68 (Fig. 5). By the described arrangement, the gearing providing for forward and reverse drive is very strongly supported by the housing, and at the same time the arrangement is very compact and the main housing can be of simple form providing among other things a lower sump which facilitates the handling of clutch fluid and lubricant for the mechanism.

As will be apparent from Fig. 3, the output shaft H has large anti-friction bearings in the housing, one being in the rear wall of the main housing section and the other being in a partition 69 which partition extends to the upper wall of the main housing and serves to support, through the bearing 56, the rear end portion of the sleeve G.

The upper cover section 66 of the main housing extends throughout the length of said housing. At its forward upper part this housing has an upwardly extended part 71 providing a chamber 72 in which the upper rear portion of the driving shell is enclosed. At the forward end this housing portion 71 is provided with a flange 73 by which it is connected at 74 to the rearward end of an approximately cylindrical cover 75 enclosing the remaining peripheral wall portion of the driving shell, the flange 73 being continued downwardly to join a lower attaching portion 76 on the housing to which the lower part of the cover 75 is suitably fastened. As shown in Fig. 3, the lower rear portion of the driving shell is extended into a space provided in the body portion of the main housing.

The gear 43ª keyed to the distributing shaft K is used for driving a pump such as the pump 70 (Fig. 2) mounted on the housing section A″. Suitable gearing, not shown, connects this gear with the mechanism of pump 70 which pumps the hydraulic fluid used for operating the clutches.

Figure 1:
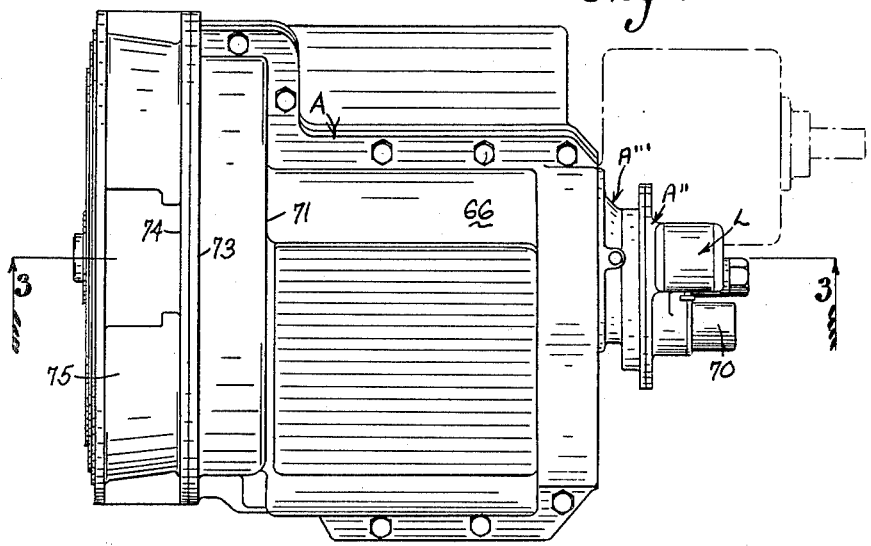
Fig. 1 is a top plan view of a reverse gear embodying the invention.

If it is desired to provide the mechanism with an auxiliary takeoff actuated from the gear 43ª, this auxiliary device may have a location such as shown by broken lines in Fig. 1.

As will be noted, the provisions for supplying motive fluid to the clutches are relatively simple and effective, and it will be noted from Fig. 4 that lubricant supplied to the lubricant space between the main driven shaft and the distributing shaft will be thrown out radially through suitable channels in the main driving shaft and in the mouth portion of the sleeve or quill in a manner to give effective lubrication to the clutches. In Fig. 4 three channels in the main driven shaft are shown, and one channel in the mouth portion of the sleeve. The rear wall of the driving shell has an opening 77 through which lubricant can pass rearwardly so as to move over the sleeve or quill on its way to the sump.

In the structure above described, the hydraulic device for actuating the two clutch groups is not provided with valves whereby the hydraulic fluid is discharged or dumped so as to go directly to the sump. The discharge passages within the driving shell partition are in communication with supply passages in the axial wall of the shell, and said discharge passages at about the middle of the shell length are inclined in the manner previously described so that when, for example, the forward clutch is to be engaged, fluid will be directed in a forward and inward direction so as to move the clutch plates of the forward group forwardly to the operative position. This is a very simple and effective means for directing fluid against the appurtenant movable friction-clutch member, and the provision of dumping valves in or in association with the partition 28 is unnecessary. The provision of the discharge recess or depression 42, mentioned as a delivery mouth, aids in obtaining quickly the necessary fluid volume and pressure on the piston. The mouth 42 has preferably the outline of a tear drop, as shown, the larger dimension of which is generally in line with the inclined passage 41. This arrangement in practice provides a simple and effective means for moving the piston quickly from an inoperative position to an operative position, and vice versa. The control of the movement of the clutch-actuating fluid by the valve member L has been described above. In engaging the forward clutch C, the lever of valve L is swung to the forward position, as above described, and from the valve the fluid moves through passage 36, passage 39 and passages 40 and 41, and to discharge mouth or recess 42. At this time a body of fluid in the space provided in the forward cylinder pushes the duplex piston into the forward or engaged position of clutch C. Then if the valve L is moved back to the neutral position, the fluid in the forward cylinder space will have its pressure lowered (by cutting it off from the fluid supply), and the spring devices 34, 35 will move the piston to the median or neutral position. This operation, in which the valve L and the forward clutch are moved back to the neutral position, will cause fluid moving back to valve L in a known manner to be discharged into the sump or other desired location. Similar effects will be produced when, by using valve L, the rear clutch D is engaged with the driving shell. No discharge or dumping valves associated with the clutch which dump the fluid so that it will move from the driving shell directly to the sump, are used in the present mechanism.

As best shown in Fig. 4, the peripheral wall 13 of the driving shell comprises the relatively wide wall section 29 provided with the partition 28, and also comprises the sections 30 and 31 which are inserted between the middle partition-carrying section and the walls 10 and 11. The section 30 is provided with splines engaged by certain plates of the forward clutch C, and in a similar manner section 31 carries splines engaged by certain plates of the rear friction clutch D.

In the reverse gear of the present invention, the bearings of the duplex reverse gear pinion that comprises the pinion shaft with its two pinions, have inner races that rotate at a comparatively low speed, whereby wear is reduced, and the location of this duplex pinion member in the same housing which contains the bearings for the mating gearing is of advantage also. By supporting the main driven shaft at its extreme forward end in the driving flange or member, the radially inner members of the two friction clutches run with greater concentricity and with minimum vibration. The friction clutch mechanism has as a prime advantage the fact that the engagement of one clutch causes the disengagement of the opposite clutch in a positive manner. It is believed to be very desirable to run the pump at all times when power is applied, and in the present mechanism this is achieved by the connection of the pump gear to the rear portion of the distributing shaft, as above described. The distributing shaft is very effectively supported for rotation in the housing, and it is effectively driven by its means of connection to the driving shell or drum adjacent the forward end of the latter.

It is to be understood that the present disclosure is by way of example only, and that various changes and modifications may be made within the scope of the claims.

What we claim is:

1. A reversing drive mechanism comprising an axially fixed rotary driving shell providing a clutch drum having forward and rear end walls and an axial wall interconnecting said end walls, a driven shaft having a forward end extending into said shell and in proximity to said forward wall, a sleeve rotatable about said shaft and having a forward end extending into the shell in proximity to said rear wall, friction clutch members respectively splined to the forward end of said shaft and the forward end of said sleeve for clutching said shaft and said sleeve respectively to the forward and rear end walls of the shell, an output shaft parallel to said driven shaft and geared thereto, gear means operable from the sleeve to impart reverse rotation to said output shaft, a duplex hydraulically operable piston in said shell intermediate said friction clutch members for engaging and releasing said clutch members, said piston being of U-shape in cross section with the intermediate part of the U disposed radially inwardly and axially, the shell having a radially inwardly extending partition intermediate the ends of the axial wall thereof and said partition being straddled by the U-shaped piston, said partition forming at least in part fluid chambers on either side thereof, and means formed within the wall structure of the shell and providing fluid passages for supplying fluid to the respective chambers, said fluid passages extending radially outward in the forward wall of the shell and continuing rearwardly to said partition and being turned to provide in the partition valveless outlets leading to said chambers, said outlets being located diametrically of said partition, the outlet for the forward chamber being inclined inwardly and forwardly with respect to the shell axis and the outlet for the rear chamber being inclined inwardly and rearwardly with respect to the shell axis, each outlet terminating in a mouth of teardrop form having its major dimension arranged radially of the partition.

2. A reversing drive mechanism as defined in claim 1, wherein said driven shaft contains two fluid passages extending longitudinally of the shaft throughout its length and in parallel relation to one another to communicate with the respective fluid passages in the shell, each passage in the driven shaft being both a supply and return conduit.

References Cited in the file of this patent

UNITED STATES PATENTS

| | | |
|---|---|---|
| 2,125,433 | Dunkelow | Aug. 2, 1938 |
| 2,234,693 | Frink | Mar. 11, 1941 |
| 2,304,031 | Schmitter | Dec. 1, 1942 |
| 2,333,037 | Osborn | Oct. 26, 1943 |
| 2,335,926 | Fawick | Dec. 7, 1943 |
| 2,464,538 | Vanderzee | Mar. 15, 1949 |
| 2,488,540 | Hollingsworth | Nov. 22, 1949 |
| 2,535,924 | Hobbs | Dec. 26, 1950 |
| 2,586,220 | Gerst | Feb. 19, 1952 |
| 2,719,621 | Clough | Oct. 4, 1955 |
| 2,825,236 | Nabstedt et al. | Mar. 4, 1958 |
| 2,841,023 | Gorshkoff | July 1, 1958 |